Dec. 2, 1969  J. A. ROBINSON  3,482,154
SERIES FILM CAPACITOR AND METHOD OF FABRICATION
Filed Oct. 6, 1967  3 Sheets-Sheet 3
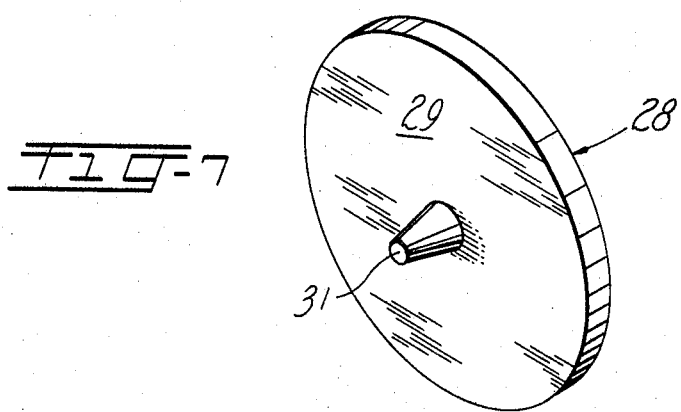
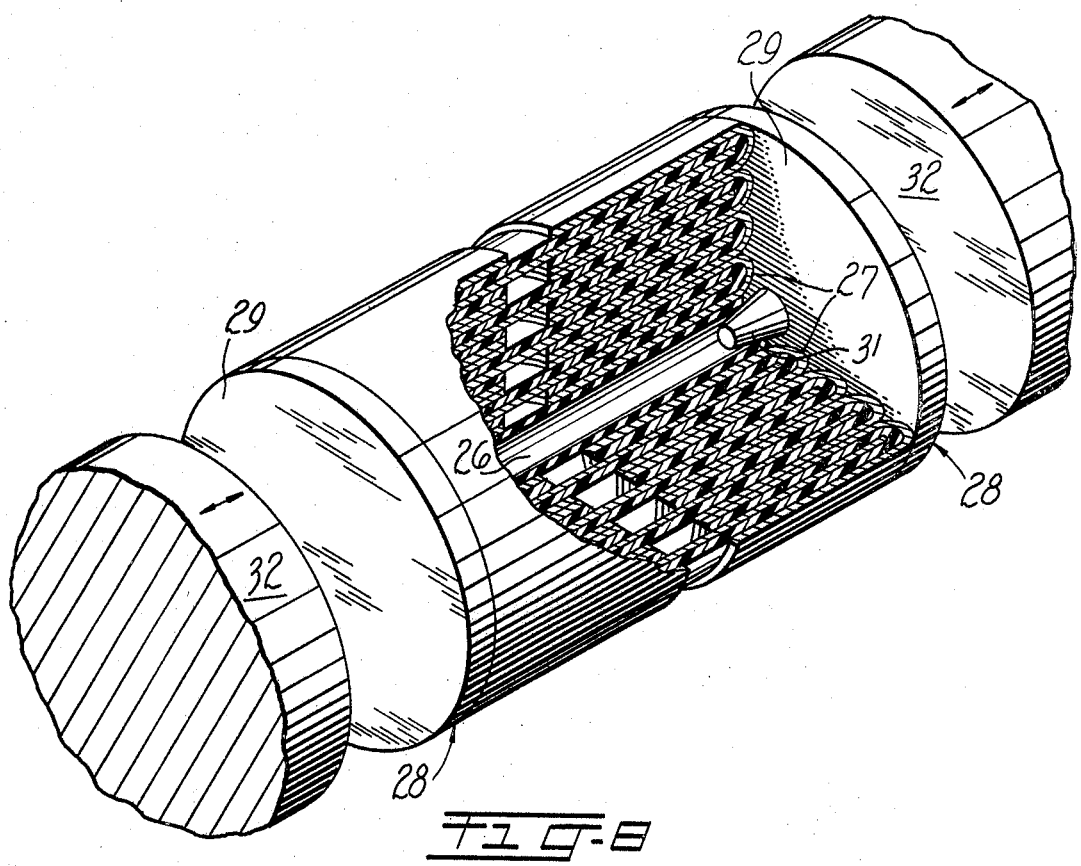

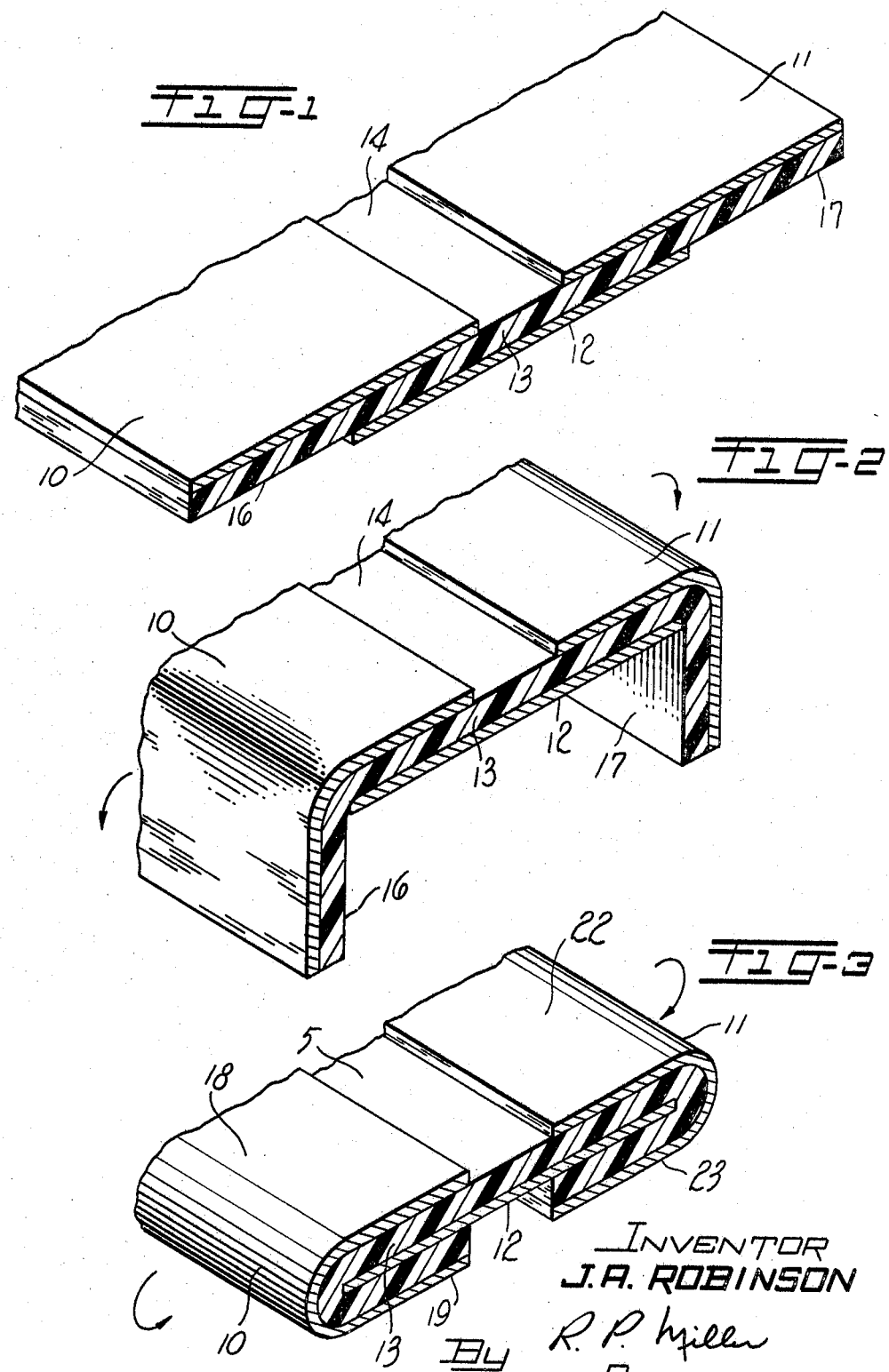

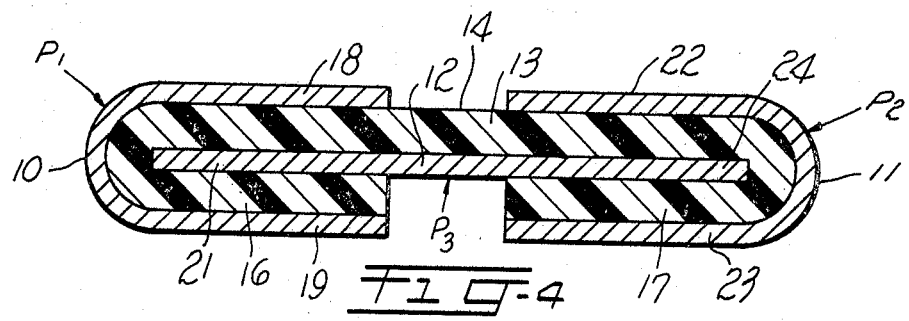
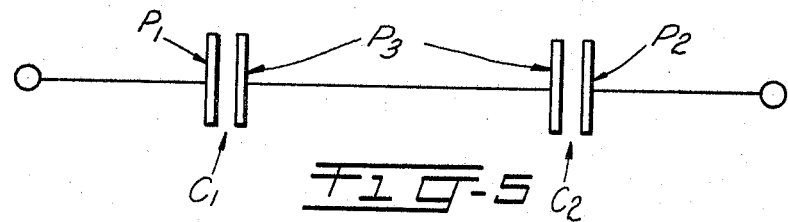
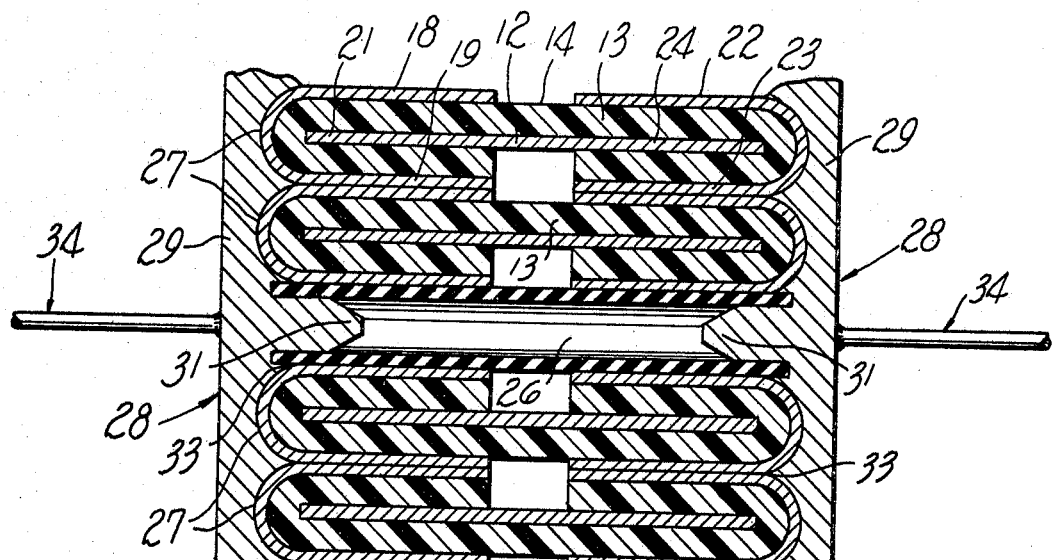

United States Patent Office 3,482,154
Patented Dec. 2, 1969

3,482,154
SERIES FILM CAPACITOR AND METHOD OF FABRICATION
John Aloysius Robinson, Leawood, Kans., assignor to Western Electric Company, Incorporated, New York, N.Y., a corporation of New York
Filed Oct. 6, 1967, Ser. No. 673,379
Int. Cl. H01g 1/00
U.S. Cl. 317—260   13 Claims

ABSTRACT OF THE DISCLOSURE

A sheet of plastic is coated on one side with a thin layer of metal along a central region to leave the edges uncoated edge of the sheet is folded over into contact the edge sections to leave a central strip uncoated. The uncoated edge of the sheet is folded over into contact with the adjacent coated region, and the sheet is wound into a roll to form two series-connected capacitive units having metal surfaces exposed at each end. The resulting capacitor is electrically and mechanically terminated by placing malleable metal discs against the exposed metal end surfaces and upsetting the discs to deform them into intimate engagement with the exposed metal surfaces.

Background of the invention

In the manufacture of electrical capacitors, difficulty is encountered in making rolled capacitors with a sufficiently low value of capacitance. If a capacitor is made of convolute layers of conductive and dielectric material wound on a tubular core, the capacitance generally exceeds the maximum desired value before a sufficient number of layers have been wound on the core to provide an adequate end surface area for terminating the capacitor. Further, there is great difficulty in precisely regulating the capacitance of a wound capacitor having only a few layers, since the addition of a fraction of a layer contributes a significant percentage increase to the total value of capacitance.

One solution to the problem of a low-value rolled capacitor is a series-wound capacitor in which two capacitive units are wound into a single section by utilizing an electrode which is common to both of the capacitive units. The capacitance of the resulting series combination is always less than the value of either of the two capacitive units, and if the values of the two units are equal, the total capacitance will be equal to one-half that of each of the two units. The use of such a series-connected arrangement permits a capacitor to be wound to a much lower value or to a more precise value than with conventional single-unit capacitor winding methods.

While series-wound capacitors are known, they have required the superposition of several distinct sheets of dielectric and conductive material. Capacitors requiring multiple sheets of dielectric material require more complex winding equipment to manufacture and are bulkier than their counterparts having only a single sheet of dielectric material. Additionally, single dielectric sheet capacitors are more easily made—by utilizing metallized film techniques—than the multiple dielectric sheet variety.

In the manufacture of rolled capacitors, an additional problem is that of providing a termination for the ends of the capacitor which is both electrically sound and structurally strong. A termination must be in electrical contact with each of the several convolute layers of a capacitor in order to effectively connect each of the capacitive elements and obtain the proper value of capacitance. Additionally, a termination must be physically strong enough to provide some rigidity to the rolled capacitor and at the same time it must not damage the conductive layers of the capacitor during its application.

A particular problem treated by the present invention is that of providing a series-connected, low-value capacitor which is wound from a single sheet of metallized dielectric material and terminated by a preform which is deformed to both, bringing it into intimate engagement with the conductive layers and lock it to the end of the capacitor.

Summary of the invention

One solution to this problem is the provision of a series-wound capacitor constructed in accordance with the instant invention. In one embodiment, a dielectric sheet is coated (1) on the side with a thin layer of metal along a central region to leave the edges uncoated and (2) on the other side along the edge sections to leave a central strip uncoated. The uncoated edges of the sheet are folded over into contact with the adjacent coated central region, and the sheet is wound into a roll.

By coating, folding and winding, a capacitor having two series-connected capacitive units is made from a single sheet of dielectric material. Further, the resulting wound capacitor has exposed metal edges which are electrically and mechanically terminated by placing malleable metal discs against the ends of the capacitor, to overlie the outermost layers of metal, and upsetting the discs to form them and bring them into intimate contact with the metal edges.

Brief description of the drawings

The nature of the present invention and its various advantages will appear more fully by referring to the following detailed description in conjunction with the appended drawing, in which:

FIG. 1 is a perspective view of a cross-wise section of a dielectric sheet coated in accordance with the invention;

FIG. 2 is a perspective view similar to FIG. 1, showing how the edges of the coated dielectric sheet are folded over to form capacitive elements;

FIG. 3 is a perspective view, similar to FIGS. 1 and 2, of a cross-wise section of the folded dielectric sheet;

FIG. 4 is a cross-sectional view of the folded dielectric sheet, showing the capacitive elements formed by the folded sheet;

FIG. 5 is a schematic of the capacitive elements shown in FIG. 4;

FIG. 6 is a cross-sectional view of a central portion of the rolled capacitor with a termination in place;

FIG. 7 is a perspective view of a termination constructed in accordance with the invention; and FIG. 8 is a perspective view, with a section cut away from the capacitor, showing how the terminations are applied to the ends of the capacitor.

Detailed description

Referring now in more detail to the drawing, FIG. 1 depicts a section from a continuous dielectric sheet coated in accordance with the instant invention. The thicknesses of the dielectric sheet and its conductive coatings are greatly exaggerated in the drawing for the sake of clarity. The actual thicknesses of the sheet may be 20 A thick, and the thicknesses of the metallized coatings are considerably less.

A single dielectric sheet 13 is coated with conductive layers 10 and 11 along opposite edge sections of a first side of the sheet leaving an exposed, nonconductive region 14 therebetween. The conductive layers 10 and 11 may be applied to leave a smal margin of exposed dielectric material along the outer edges of the sheet 13 to insure against the conductive material overlapping the edges of the sheet 13. A single common layer of conductive material 12 is coated onto a central section of the second side of the sheet leaving exposed, nonconductive edge sections 16 and 17 along opposite edges of the sheet. Preferably, but not necessarily, the single conductive layer 12 on the second side of the sheet extends to underlie the conductive layers 10 and 11 on the first side. The dielectric sheet 13 may be made of paper or plastic such as polycarbonate, polystyrene or polyester sold under the tradename "Mylar"; however, any flexible dielectric material may be used, and the conductive layers 10, 11 and 12 may be of any conductive material such as aluminum, silver, zinc, or alloys thereof. Although it is preferable to position the conductive layers 10, 11 and 12 contiguous to the dielectric sheet 13 by selectively coating the dielectric sheet 13 using metal vapor deposition techniques, other methods could be used, e.g., sputtering, or simply placing a strip of metal foil next to the dielectric sheet without bonding the surfaces together.

After the dielectric sheet 13 has been coated with conductive layers 10, 11 and 12, the edges of the sheet are folded about axes parallel to the central axis of the sheet, as shown in FIG. 2, to overlie an undersurface of the sheet, as shown in FIG. 3. Folding brings the uncoated edge sections 16 and 17 over into contact with the centrally disposed common conductive layer 12 so that opposite edge sections of the common layer 12 extend between the inner surfaces of the folded edge sections 16 and 17. As can be seen from FIG. 3, the folded sheet 13 has conductive edge sections 18–19 and 22–23 which both overlie and underlie the centrally disposed conductive layer 12.

The folded sheet comprises a pair of series-connected capacitive units as shown and illustrated in FIGS. 4 and 5 wherein the folded conductive layers 10 and 11, contiguous to the top of the unfolded sheet 13 and bottom outersurfaces of the folded edge sections 16 and 17, cooperate with the common conductive layer 12 to form the respective capacitive units. More specifically, in the first capacitive unit the overlying section 18 of the first conductive edge section 10 forms an upper plate, the underlying section 19 of the conductive layer 10 forms a lower plate, and a first edge 21 of the central conductive layer 12 forms a center plate. By the same token, the second capacitive unit has an upper plate formed by an overlying section 22 of the second conductive edge section 11, a lower plate formed by the underlying section 23 of the conductive layer 11, and a center plate formed by a second edge 24 of the central conductive layer 12. Since the upper plate and lower plates of the first capacitive unit are preferably each part of a single conductive layer, they form, together, a first unitary plate $P_1$ for the first capacitive unit. Likewise, the electrically connected upper and lower plates form a second unitary plate $P_2$ for the second capacitive unit. The conductive layer 12 common to the two capacitive units forms a common plate $P_3$.

The schematic diagram of FIG. 5 illustrates how the two capacitive units are electrically interconnected to form a unitary, series-connected capacitor. If the capacitance of the capacitive unit between $P_1$ and $P_3$ is called $C_1$, and between $P_3$ and $P_2$ is called $C_2$, the total capacitance of the series combination $C_T$ is given by the formula:

(1) $$\frac{1}{C_T} = \frac{1}{C_1} + \frac{1}{C_2}$$

(2) $$C_T = \frac{C_1 C_2}{C_1 + C_2}$$

As can be readily seen from the relationship given in Formula 2, the total capacitance always is less than either one of the two series-connected constituents. Therefore, the series-connected rolled capacitor has a lower value of capacitance than could be made using only a single capacitive unit.

As shown in FIGS. 6 and 8, after the coated dielectric sheet is folded it is wound around a rigid insulative tubular core 26 to form convolute layers 27 of conductive and dielectric material having exposed metal edge surfaces at the ends of the capacitor. A sufficient number of layers 27 is wound onto the core 26 to give the desired value of capacitance. The metal edges of the layers 27 provide a convenient means of electrical termination or connection to the capacitor. After winding, the capacitor is electrically and mechanically terminated with a pair of terminations 28 as shown in FIG. 7. Each termination 28 is formed of a rectangular slug or circular disc of a deformable conductive material, having a radially extending flange 29 and a frusto-conical projection 31 extending from the center of the disc. The deformable material may be a solder such as lead, zinc, tin or silver or alloys thereof. The base portion of the projection is selected to be slightly larger than the inner diameter of the core 26.

The wound capacitor is terminated as shown in FIG. 8 by first inserting the conical projections 31—31 into the open ends of the tubular core 26. The radially extending flanges 29—29 of the terminations 28—28 overlie the outermost layers 27 of the capacitor. When the terminations 28—28 are in position, an upsetting force is applied to the opposite ends of the capacitors by rams 32—32 (actuated by means not shown) to deform the terminations 28—28 and flow the malleable metal into intimate contact with the ends of the convolute conductive layers 27 (as shown in FIG. 6). The forward walls of the flanges are forced into the interstices 33 between the adjacent convolutions. As the termination is upset, the conical projections 31—31 are deformed within the tubular core 26 to lock the terminations 29—29 in position and form both a strong structural support and a good electrical connection. After termination, a pair of leads 34—34 (FIG. 6) are attached to the terminations 28—28 to provide for convenient electrical connection, and the finished capacitor may be coated with a protective covering (not shown) to keep out moisture.

In the alternative, the lead may be integral with the termination 28, in which case, the rams would be provided with axial apertures to receive the leads during the deformation of the terminations. In addition, to facilitate termination, the slug or disc may be preheated to soften the solder.

It will be understood that the embodiments and alternatives are illustrative of the principles of the invention and many others could be devised, without departing from the spirit and scope of the invention.

I claim:

1. A capacitance device, comprising:
   a sheet of dielectric material having opposed edge sections folded in opposed directions back upon the sheet;
   a common layer of conductive material contiguous to said dielectric sheet and extending to underlie said folded sections of said dielectric sheet;
   a pair of spaced layers of conductive material contiguous to said dielectric sheet and folded about said folded sections of said sheet to form a pair of series capacitor units with said common layer.

2. In a rolled capacitor;
   convolutions of dielectric sheet material having folded edge sections,
   a common conductive layer contiguous to said sheet material and extending between the inner surfaces of said folded edge sections, and
   said folded edge sections having conductive layers contiguous to both the top and bottom outer surfaces cooperating with said common layer to form capacitive units.

3. A wound capacitor having two capacitor units connected in series, which comprises:
   a single rolled dielectric sheet having both edge sections folded back about a central section of said sheet to overlie an undersurface of said sheet;

a first common conductive layer contiguous to said undersurface and extending under said folded back edge sections;

a second conductive layer contiguous to an outer surface of a first of said folded edge sections and extending to underlie a first edge section of said first common layer to form a first of said capacitor units; and a third conductive layer contiguous to an outer surface of the second of said folded edge sections and extending to underlie the second edge section of said first common layer to form the second of said capacitor units connected in series through said common layer to said first capacitor unit.

4. A capacitor as set forth in claim 3, in which:
said second and said third conductive layers extend contiguously along the outer surfaces of said first and said second folded edges beyond the undersurface of said sheet to form exposed conductive surfaces for electrical termination of said capacitor.

5. A wound capacitor as set forth in claim 3, in which:
said second and said third conductive layers extend contiguously along the outer surface of said folded edge sections to both underlie and overlie said edge sections of said first common layer.

6. A capacitor having electrically terminated convolute layers of conductive material wound upon a tubular core to form two capacitor units connected in series, which comprises:

a single dielectric sheet wound around said tubular core, said dielectric sheet having both edge sections folded back about a central section of said sheet to overlie an undersurface of said sheet;

a first convolute, common conductive layer contiguous to said undersurface and extending under said folded back edge sections;

a second convolute conductive layer contiguous to an outer surface of a first of said folded edge sections and extending to underlie a first edge section of said first common layer to form a first of said capacitor units;

a third convolute conductive layer contiguous to an outer surface of the second of said folded edge sections and extending to underlie the second edge section of said first common layer to form the second of said capacitor units connected in series through said common layer to said first capacitor unit; and a pair of deformable preforms of conductive material each having a flange and a tapered projection, which tapered projections are forced into opposite ends of said tubular core to deform the preforms and lock the flanges into intimate contact with said second and third convolute conductive layers to form electrical terminations for said capacitor.

7. In combination:
an electrical device having convolute layers of conductive material wound upon a tubular core; and a termination for said device comprising a deformable preform of conductive material having a flange and a tapered projection being wider at the junction of said projection and said flange than the inside width of said tubular core and narrower at the opposite end of said projection than the inside width of said tubular core, said projection being fitted into the end of said tubular core, the flange being in intimate contact with the edges of said layers of said conductive material.

8. A method of making a wound capacitor comprising:
positioning first and second layers of conductive material contiguous to opposite edges of a first side of a dielectric sheet to define a pair of conductive edge sections with a nonconductive region therebetween;

positioning a common layer of conductive material contiguous to a central section of the second side of said sheet to define a pair of nonconductive edge sections along opposite edges of the second side of said sheet;

folding the edges of said sheet to bring said nonconductive edge sections on the second side of said sheet into engagement with said common layer of conductive material and to position said conductive edge sections on the first side of said sheet to underlie said common layer; and winding the folded dielectric sheet into a roll.

9. A method of making a wound capacitor as set forth in claim 8, wherein the common layer is positioned to underlie said common conductive edge sections, and the edges of the sheet are folded to position the first and second layers of conductive material contiguous to opposite edges of the first side of said sheet to form layers of conductive material both underlying and overlying said common layer of conductive material on said folded sheet.

10. A method of making a wound capacitor as set forth in claim 8, wherein the opposite edges of the sheet are folded to position the first and second layers of conductive material to extend beyond the undersurface of said folded sheet and form exposed conductive surfaces for electrical termination of said capacitor.

11. A method of fabricating a rolled capacitor, which comprises:
laying strips of conductive material along opposite edge sections on one side of a sheet of dielectric material;

laying a common strip of conductive material along the opposite side of said sheet, to leave exposed, opposite edge sections;

folding said opposite edge sections to bring said conductive strips into overlying and underlying relationship with said common strip; and then winding said sheet into a roll.

12. A method of making a wound capacitor having convolute conductive layers terminated by a pair of deformable conductive preforms each having a flange with a tapered projection from the face thereof, comprising:
positioning layers of conductive material contiguous to opposite edges of a first side of a dielectric sheet to define a pair of conductive edge sections with a nonconductive region therebetween;

positioning a common layer of conductive material contiguous to a central section of the second side of said sheet to overlie a portion of said nonconductive region on the first side of said sheet and to define a pair of nonconductive edge sections along opposite edges of the second side of said sheet;

folding the edges of said sheet about a central region to bring said nonconductive edge sections on the second side of said sheet into engagement with said common layer of conductive material and to position said conductive edge sections on the first side of said sheet to underlie said common layer;

winding the folded dielectric sheet around a tubular core to form convolute layers of conductive material;

inserting the tapered projections of said preforms into opposite ends of said tubular core with the flanges of said preforms overlying the outermost convolute layers of conductive material; and applying an upsetting force to said preforms to (1) deform said preforms and flow the material of said flanges into intimate contact with said convolute layers of conductive matetrial and (2) deform the tapered projections within the ends of said tubular core to lock the preforms in place as electrical terminations for the capacitor.

13. A method of terminating a capacitor having convolute layers of conductive material wound upon a tubular core with a preform of deformable conductive material having a flange and a tapered projection on one face thereof, comprising:

inserting said tapered projection into said tubular core with said flange overlying the outermost layers of conductive material; and applying an upsetting force to said preform to deform said preform and flow the material of said flange into electrical engagement with said convolute layers and at the same time deform the tapered projection within said tubular core to lock the preform in position.

References Cited

UNITED STATES PATENTS

| | | | |
|---|---|---|---|
| 1,835,582 | 12/1931 | Allen | 338—322 |
| 2,640,903 | 6/1953 | Kohring | 338—322 |

FOREIGN PATENTS

| | | |
|---|---|---|
| 933,881 | 10/1955 | Germany. |
| 563,084 | 7/1944 | Great Britain. |
| 487,967 | 3/1952 | Italy. |

E. A. GOLDBERG, Primary Examiner

U.S. Cl. X.R.

29—25.42; 317—242, 261

L-566-PT
(6-69)

UNITED STATES PATENT OFFICE
CERTIFICATE OF CORRECTION

Patent No. __3,482,154__   Dated __December 2, 1969__

Inventor(s) __John A. Robinson__

It is certified that error appears in the above-identified patent and that said Letters Patent are hereby corrected as shown below:

Col. 1, line 16, delete "edge of the sheet is folded over into contact".

Col. 1, line 16, after "uncoated", insert --and is, also, coated on the other side along--.

Col. 2, line 30, after "to", delete "form" and insert --deform--.

Col. 2, line 65, after "20", delete "A", and insert --A.--.

Col. 2, line 73, after "a", delete "smal", and insert --small--.

SIGNED AND
SEALED
JUL 28 1970

(SEAL)
Attest:

Edward M. Fletcher, Jr.
Attesting Officer

WILLIAM E. SCHUYLER, JR.
Commissioner of Patents